(12) United States Patent
Quach et al.

(10) Patent No.: US 8,712,833 B2
(45) Date of Patent: Apr. 29, 2014

(54) SYSTEM AND METHOD FOR ADVERTISING MESSAGES ON DISTRIBUTED DOCUMENT PROCESSING DEVICES

(75) Inventors: Tony T. Quach, Anaheim, CA (US); Peter Tran, Garden Grove, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1435 days.

(21) Appl. No.: 12/125,423

(22) Filed: May 22, 2008

(65) Prior Publication Data
US 2009/0292610 A1 Nov. 26, 2009

(51) Int. Cl.
*G06Q 30/02* (2012.01)

(52) U.S. Cl.
USPC .............. 705/14; 40/606.04; 221/2; 221/155; 700/232; 705/1.1; 705/14.38; 705/14.49; 705/14.51; 705/14.52; 705/14.55; 705/14.58; 705/14.65; 705/500; 709/217

(58) Field of Classification Search
None
See application file for complete search history.

(56) References Cited

U.S. PATENT DOCUMENTS

| | | | |
|---|---|---|---|
| 6,442,529 B1* | 8/2002 | Krishan et al. ............ | 705/14.52 |
| 6,604,085 B1* | 8/2003 | Kolls ........................ | 705/14.23 |
| 6,804,659 B1* | 10/2004 | Graham et al. ............ | 705/14.49 |
| 7,124,093 B1* | 10/2006 | Graham et al. ............ | 705/14.41 |
| 7,299,576 B2* | 11/2007 | Martin et al. .............. | 40/544 |
| 7,478,089 B2* | 1/2009 | Henkin et al. ............. | 1/1 |
| 7,712,628 B2* | 5/2010 | Guindulain Vidondo .... | 221/155 |
| 7,797,168 B2* | 9/2010 | Kusumoto et al. ......... | 705/1.1 |
| 2002/0077889 A1* | 6/2002 | Kolls ........................ | 705/14 |
| 2002/0147646 A1* | 10/2002 | Ogura et al. .............. | 705/14 |
| 2003/0150146 A1* | 8/2003 | Martin et al. .............. | 40/544 |
| 2004/0133466 A1* | 7/2004 | Redmond et al. .......... | 705/14 |
| 2004/0162757 A1* | 8/2004 | Pisaris-Henderson et al. . | 705/14 |
| 2005/0107912 A1* | 5/2005 | Martin et al. .............. | 700/232 |
| 2006/0212411 A1* | 9/2006 | Gabay, Jr. .................. | 705/500 |
| 2006/0271424 A1* | 11/2006 | Gava et al. ................. | 705/14 |
| 2007/0089339 A1* | 4/2007 | Vidondo .................... | 40/606.04 |
| 2007/0095901 A1* | 5/2007 | Illingworth ................ | 235/381 |
| 2007/0100696 A1* | 5/2007 | Illingworth ................ | 705/14 |
| 2007/0241120 A1* | 10/2007 | Henry ........................ | 221/2 |
| 2008/0071881 A1* | 3/2008 | Kronlund et al. .......... | 709/217 |
| 2008/0172243 A1* | 7/2008 | Kelly ......................... | 705/1 |
| 2009/0063283 A1* | 3/2009 | Kusumoto et al. ......... | 705/14 |
| 2009/0157508 A1* | 6/2009 | Illingworth et al. ....... | 705/14 |
| 2009/0248512 A1* | 10/2009 | Su et al. .................... | 705/14 |
| 2010/0293569 A1* | 11/2010 | Kusumoto et al. ......... | 725/23 |

FOREIGN PATENT DOCUMENTS

WO WO0188803 * 11/2001 ............. G06F 17/60

* cited by examiner

*Primary Examiner* — Robert Niquette
(74) *Attorney, Agent, or Firm* — SoCal IP Law Group LLP; Steven C. Sereboff; Jonathan Pearce

(57) ABSTRACT

The subject application is directed to a system and method for selective control of advertising messages on distributed document processing devices. Device identification data is first received corresponding to the identity of networked document processing devices available for display of selected advertising content. Device selection data representing a selected subset of the networked document processing devices is then received, with the selection made in accordance with the received identification data. Next, customization data is received corresponding to a selected display parameter associated with the selected advertising content. The selected advertising content and the received customization data are then communicated to each of the networked document processing devices in the selected subset. Each of the document processing devices then commences the display of the selected advertising content in accordance with the customization data.

13 Claims, 9 Drawing Sheets

SYSTEM AND METHOD FOR ADVERTISING MESSAGES ON DISTRIBUTED DOCUMENT PROCESSING DEVICES

BACKGROUND OF THE INVENTION

The subject application pertains generally to generating displays on a plurality of networked devices. The application is particularly applicable to generating user-selected paid advertising on displays of document processing devices which is generated during idle time of each respective device.

Document processing devices include printers, copiers, scanners, or facsimile machines. Modern day document processing devices frequently include two or more of these functions, and are referred to as multifunction peripherals (MFPs) or multifunction devices (MFDs).

Today, various document processing devices are frequently scattered over an enterprise, or are installed in conveniently accessible locations, such as hotels or airports. Modern document processing devices are extremely powerful, and simplified or intuitive control of such complex devices is frequently provided through a graphical user interface. Such graphical user interfaces may be pointer driven, such as via a mouse, touchpad or trackball, or may employ touch screens. The decreasing cost of such displays, coupled with a desire to make machine/user interaction as easy as possible, has lead to incorporation of larger and larger displays, including color displays, on such devices.

While document processing devices are frequently placed in widely accessible locations, servicing one company or the general public ability, devices typically have large periods of inactivity.

SUMMARY OF THE INVENTION

In accordance with one embodiment of the subject application, there is provided a system and method for generating displays on a plurality of networked devices.

Further, in accordance with one embodiment of the subject application, there is provided a system and method for generating user-selected, paid advertising, on displays of document processing devices which is generated during idle time of each respective device.

Still further in accordance with one embodiment of the subject application, there is provided a system for selective control of advertising messages on distributed document processing devices. The system comprises means adapted for receiving device identification data corresponding to an identity of each of a plurality of networked document processing devices available for display of selected advertising content. The system also comprises means adapted for receiving device selection data representative of a selected subset of the plurality of networked document processing devices, which selection is made in accordance with received identification data and means adapted for receiving customization data corresponding to a selected display parameter associated with the selected advertising content. The system further comprises means adapted for communicating the selected advertising content and received customization data to each of the subset of document processing devices so as commence a display of the selected advertising content on each of the subset of document processing devices in accordance with the customization data.

Still further, in accordance with one embodiment of the subject application, there is provided a method for selective control of advertising messages on distributed document processing devices. The method includes the step of receiving device identification data corresponding to an identity of each of a plurality of networked document processing devices available for display of selected advertising content. The method also includes the step of receiving device selection data representing a selected subset of the plurality of networked document processing devices, with the selection made in accordance with the received identification data. The method further comprises the steps of receiving customization data corresponding to a selected display parameter associated with the selected advertising content, and communicating the selected advertising content and received customization data to each of the document processing devices in the selected subset so as to commence a display of the selected advertising content on each of the subset of document processing devices in accordance with the customization data.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for generating displays on a plurality of networked devices. In particular, the subject application is directed to a system and method for generating user-selected, paid advertising, on displays of document processing devices which is generated during idle time of each respective device. More particularly, the subject application is directed to a system and method for selective control of advertising messages on distributed document processing devices. It will become apparent to those skilled in the art that the system and method described herein are suitably adapted to a plurality of varying electronic fields employing selected advertising, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
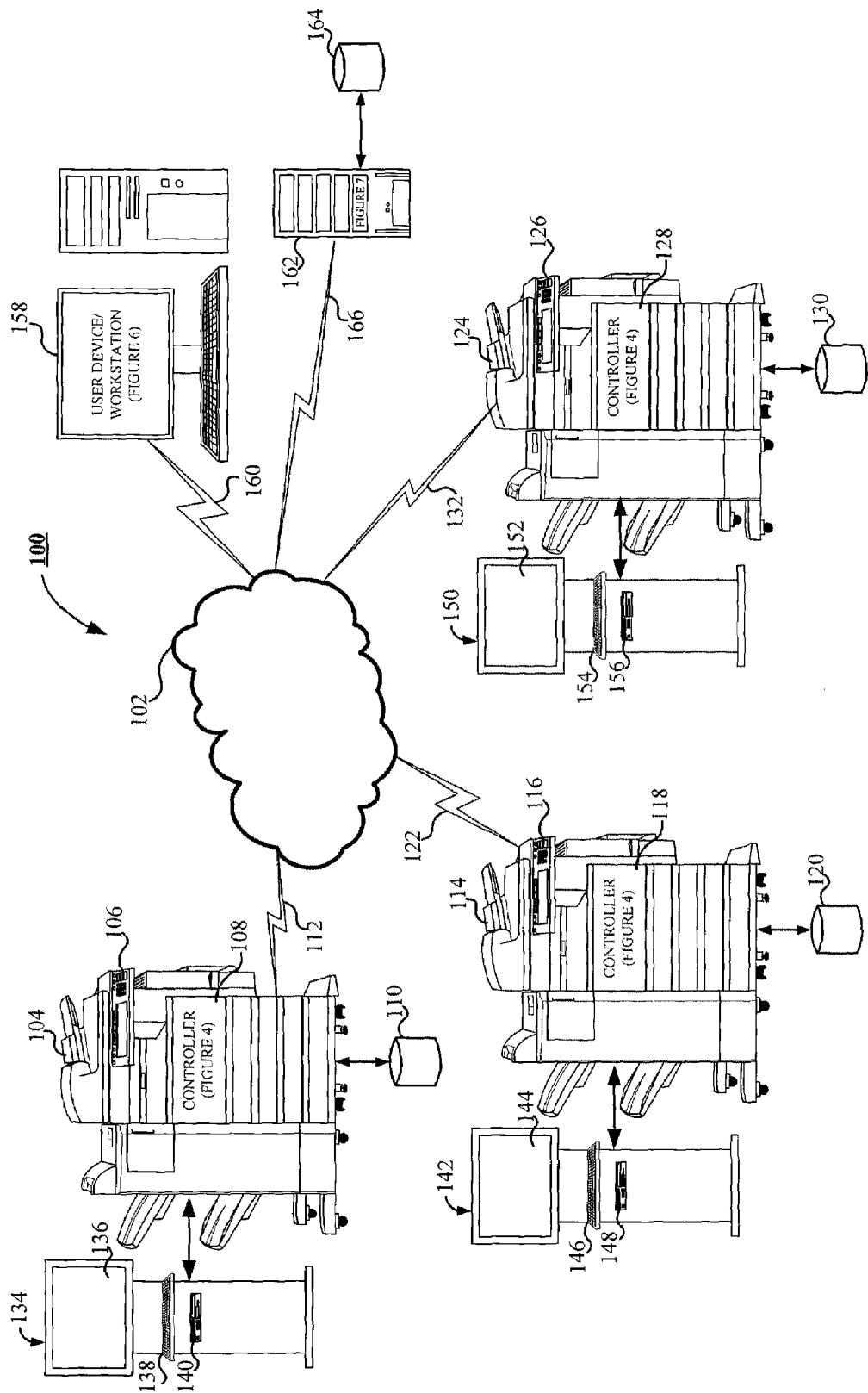
FIG. 1 is an overall diagram of a system for selective control of advertising messages on distributed document processing devices according to one embodiment of the subject application.

Referring now to FIG. 1, there is shown an overall diagram of a system 100 for selective control of advertising messages on distributed document processing devices in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also one or more document processing devices, depicted in FIG. 1 as the document processing devices 104, 114, and 124. As shown in FIG. 1, the document processing devices 104, 114, and 124 are illustrated as multifunction peripheral devices, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing devices 104, 114, and 124 are suitably adapted to provide remote document processing services to external or network devices. Preferably, the document processing devices 104, 114, and 124 include hardware, software, and any suitable combination thereof, configured to interact with an associated user, a networked device, or the like.

According to one embodiment of the subject application, the document processing devices 104, 114, and 124 are suitably equipped to receive a plurality of portable storage media, including, without limitation, Firewire drive, USB drive, SD, MMC, XD, Compact Flash, Memory Stick, and the like. In the preferred embodiment of the subject application, the document processing devices 104, 114, and 124 further include associated user interfaces 106, 116, and 126, such as a touch-screen, LCD display, touch-panel, alpha-numeric keypad, or the like, via which an associated user is able to interact directly with the document processing devices 104, 114, and 124. In accordance with the preferred embodiment of the subject application, the user interfaces 106, 116, and 126 are advantageously used to communicate information to associated users and receive selections from such associated users.

The skilled artisan will appreciate that the user interfaces 106, 116, and 126 comprise various components, suitably adapted to present data to associated users, as are known in the art. In accordance with one embodiment of the subject application, the user interfaces 106, 116, and 126 comprise a display, suitably adapted to display one or more graphical elements, text data, images, or the like, to an associated user, receive input from the associated user, and communicate the same to a backend component, such as controllers 108, 118, and 128, as explained in greater detail below. Preferably, the document processing devices 104, 114, and 124 are communicatively coupled to the computer network 102 via suitable communications links 112, 122, and 132. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art. The functioning of the document processing devices 104, 114, and 124 will be better understood in conjunction with the block diagrams illustrated in FIGS. 2 and 3, explained in greater detail below.

In accordance with one embodiment of the subject application, the document processing devices 104, 114, and 124 further incorporate a backend component, designated as the controllers 108, 118, and 128, suitably adapted to facilitate the operations of their respective document processing devices 104, 114, and 124, as will be understood by those skilled in the art. Preferably, the controllers 108, 118, and 128 are embodied as hardware, software, or any suitable combination thereof, configured to control the operations of the associated document processing devices 104, 114, and 124, facilitate the display of images via the user interfaces 106, 116, and 126, direct the manipulation of electronic image data, and the like. For purposes of explanation, the controllers 108, 118, and 128 are used to refer to any myriad of components associated with the document processing devices 104, 114, and 124, including hardware, software, or combinations thereof, functioning to perform, cause to be performed, control, or otherwise direct the methodologies described hereinafter. It will be understood by those skilled in the art that the methodologies described with respect to the controllers 108, 118, and 128 are capable of being performed by any general purpose computing system, known in the art, and thus the controllers 108, 118, and 128 are representative of such a general computing device and is intended as such when used hereinafter. Furthermore, the use of the controllers 108, 118, and 128 hereinafter is for the example embodiment only, and other embodiments, which will be apparent to one skilled in the art, are capable of employing the system and method for selective control of advertising messages on distributed document processing devices of the subject application. The functioning of the controllers 108, 118, and 128 will better be understood in conjunction with the block diagrams illustrated in FIGS. 4 and 5, explained in greater detail below.

Communicatively coupled to the document processing devices 104, 114, and 124 are data storage devices 110, 120, and 130. In accordance with the preferred embodiment of the subject application, the data storage devices 110, 120, and 130 are any mass storage device known in the art including, for example and without limitation, magnetic storage drives, a hard disk drive, optical storage devices, flash memory devices, or any suitable combination thereof. In the preferred embodiment, the data storage devices 110, 120, and 130 are suitably adapted to store document data, image data, electronic database data, or the like. It will be appreciated by those skilled in the art that while illustrated in FIG. 1 as being a separate component of the system 100, the data storage devices 110, 120, and 130 are capable of being implemented as internal storage components of the document processing devices 104, 114, and 124, components of the controllers 108, 118, and 128, or the like, such as, for example and without limitation, an internal hard disk drive, or the like.

Illustrated in FIG. 1 are a first kiosk 134, communicatively coupled to the first document processing device 104, and in effect, the computer network 102, a second kiosk 142, communicatively coupled to the second document processing device 114, and in effect, the computer network 102, a third kiosk 150 communicatively coupled to the third document processing device 124, and in effect the computer network 102. It will be appreciated by those skilled in the art that the kiosks 134, 142, and 150 are capable of being implemented as separate components of the respective document processing devices 104, 114, and 124, or as integral components thereof. Use of the kiosks 134, 142, and 150 in FIG. 1 are for example purposes only, and the skilled artisan will appreciate that the subject application is capable of implementation without the use of kiosks 134, 142, and 150. In accordance with one embodiment of the subject application, the kiosks 134, 142, and 150 include respective displays 136, 144, and 152 and user input devices 138, 146, and 154. As will be understood by those skilled in the art the kiosks 134, 142, and 150 are capable of implementing a combination user input device/display, such as a touch screen interface. According to one embodiment of the subject application, the kiosks 134, 142, and 150 are suitably adapted to display selected advertisements to prospective customers, prompts to an associated user, receive instructions from the associated user, receive payment data, receive selection data from the associated user, and the like. Preferably, the kiosks 134, 142, and 150 include a magnetic card reader, conventional bar code reader, or the like, suitably adapted to receive and read payment data from a credit card, coupon, debit card, or the like.

The system 100 of FIG. 1 also includes portable storage device readers 140, 148, and 156, coupled to the kiosks 134, 142, and 150 and suitably adapted to receive and access a myriad of different portable storage devices. Examples of such portable storage devices include, for example and without limitation, flash-based memory such as SD, xD, Memory Stick, compact flash, CD-ROM, DVD-ROM, USB flash drives, or other magnetic or optical storage devices, as will be known in the art.

The system 100 illustrated in FIG. 1 further depicts a user device 158, in data communication with the computer network 102 via a communications link 160. It will be appreciated by those skilled in the art that the user device 158 is shown in FIG. 1 as a computer workstation for illustration purposes only. As will be understood by those skilled in the art, the user device 158 is representative of any personal computing device known in the art, including, for example and without limitation, a laptop computer, a personal computer, a personal data assistant, a web-enabled cellular telephone, a smart phone, a proprietary network device, or other web-enabled electronic device. The communications link 160 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 158 is suitably adapted to monitor operations of the computer network 102, the document processing devices 104, 114, and 124, or any other similar device coupled to the computer network 102, correspond with third party suppliers, connect to the Internet, communicate with a backend database, e.g. server 162, and the like. The functioning of the user device 158 will better be understood in conjunction with the block diagram illustrated in FIG. 6, explained in greater detail below.

The system 100 of FIG. 1 also includes a server 162 suitably adapted to facilitate the advertisement database 164 representative of advertisements capable of being displayed by the document processing devices 104, 114, and 124. Preferably, the server 162 is communicatively coupled to the computer network 102 via a suitable communications link 166. It will be appreciated by those skilled in the art that the server 162 comprises hardware, software, and combinations thereof suitably adapted to provide one or more services, web-base applications, storage options, and the like, to networked devices. In accordance with one embodiment of the subject application, the server 162 includes various components, implemented as hardware, software, or a combination thereof, for managing the retention of electronic data, performing searches, storing advertisements, storing account information, storing billing information, retrieval of documents, and the like, which are accessed via the computer network 102. The communications link 166 is any suitable data communications means known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. It will be appreciated by those skilled in the art that the components described with respect to the server 162 hereinafter are capable of implementation on any computing device coupled to the computer network 102 and functioning as a backend server.

Communicatively coupled to the server 162 is the data storage device 164. In accordance with the preferred embodiment of the subject application, the data storage device 164 is any mass storage device, or plurality of such devices, known in the art including, for example and without limitation, magnetic storage drives, a hard disk drive, optical storage devices, flash memory devices, or any suitable combination thereof. In the preferred embodiment, the data storage device 164 is suitably adapted to store advertisement data, location data, software updates, update lists, electronic database data, document data, image data, account data, user data, and the like. It will be appreciated by those skilled in the art that while illustrated in FIG. 1 as being a separate component of the system 100, the data storage device 164 is capable of being implemented as internal storage component of the server 162, or the like, such as, for example and without limitation, an internal hard disk drive, or the like.

Figure 2:
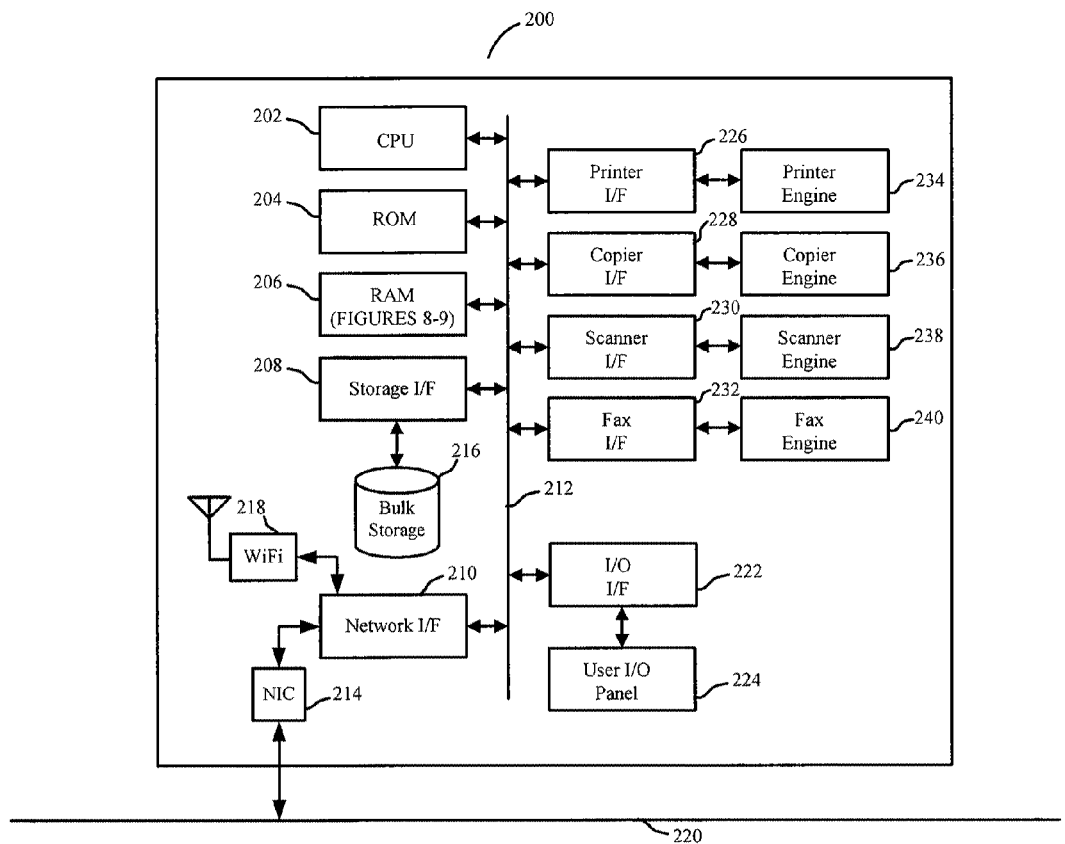
FIG. 2 is a block diagram illustrating device hardware for use in the system for selective control of advertising messages on distributed document processing devices according to one embodiment of the subject application.

Turning now to FIG. 2, illustrated is a representative architecture of a suitable device 200, shown in FIG. 1 as the document processing devices 104, 114, and 124, on which operations of the subject system are completed. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the device 200.

Also included in the device 200 is random access memory 206, suitably formed of dynamic random access memory, static random access memory, or any other suitable, addressable memory system. Random access memory provides a storage area for data instructions associated with applications and data handling accomplished by the processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and the network subsystem 210 is suitably accomplished via a bus data transfer mechanism, such as illustrated by the bus 212.

Suitable executable instructions on the device 200 facilitate communication with a plurality of external devices, such as workstations, document processing devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with the bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
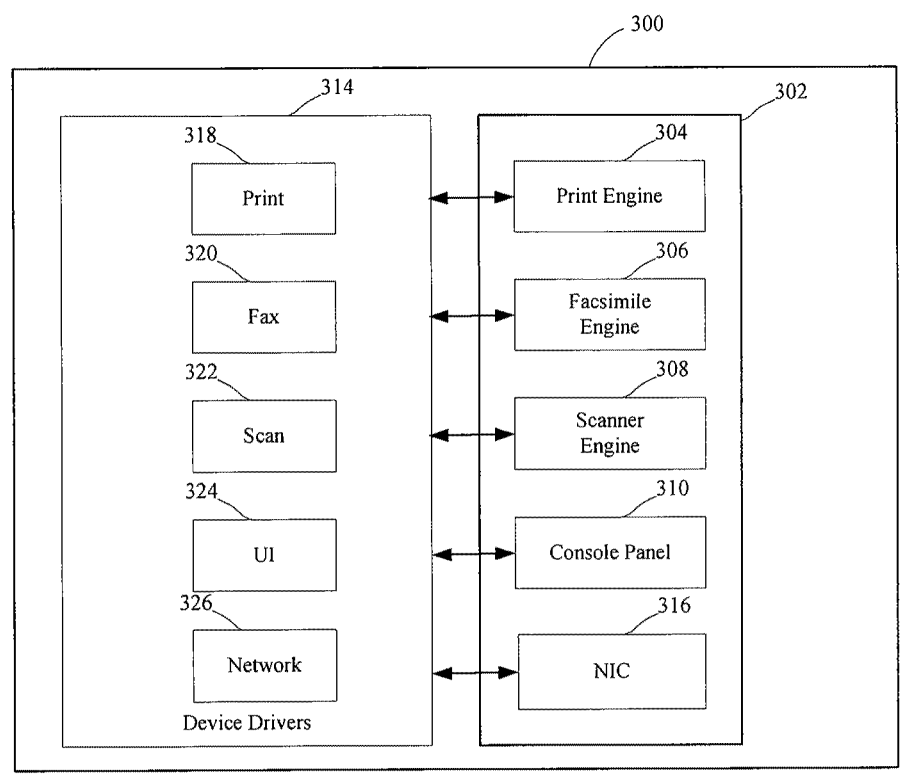
FIG. 3 is a functional diagram illustrating the device for use in the system for selective control of advertising messages on distributed document processing devices according to one embodiment of the subject application.

Turning now to FIG. 3, illustrated is a suitable document processing device, depicted in FIG. 1 as the document processing devices 104, 114, and 124, for use in connection with the disclosed system. FIG. 3 illustrates suitable functionality of the hardware of FIG. 2 in connection with software and operating system functionality as will be appreciated by one of ordinary skill in the art. The document processing device 300 suitably includes an engine 302 which facilitates one or more document processing operations.

The document processing engine 302 suitably includes a print engine 304, facsimile engine 306, scanner engine 308 and console panel 310. The print engine 304 allows for output of physical documents representative of an electronic document communicated to the processing device 300. The facsimile engine 306 suitably communicates to or from external facsimile devices via a device, such as a fax modem.

The scanner engine 308 suitably functions to receive hard copy documents and in turn image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format, and is also suitably configured for optical character recognition. Tangible document scanning also suitably functions to facilitate facsimile output thereof.

In the illustration of FIG. 3, the document processing engine also comprises an interface 316 with a network via driver 326, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
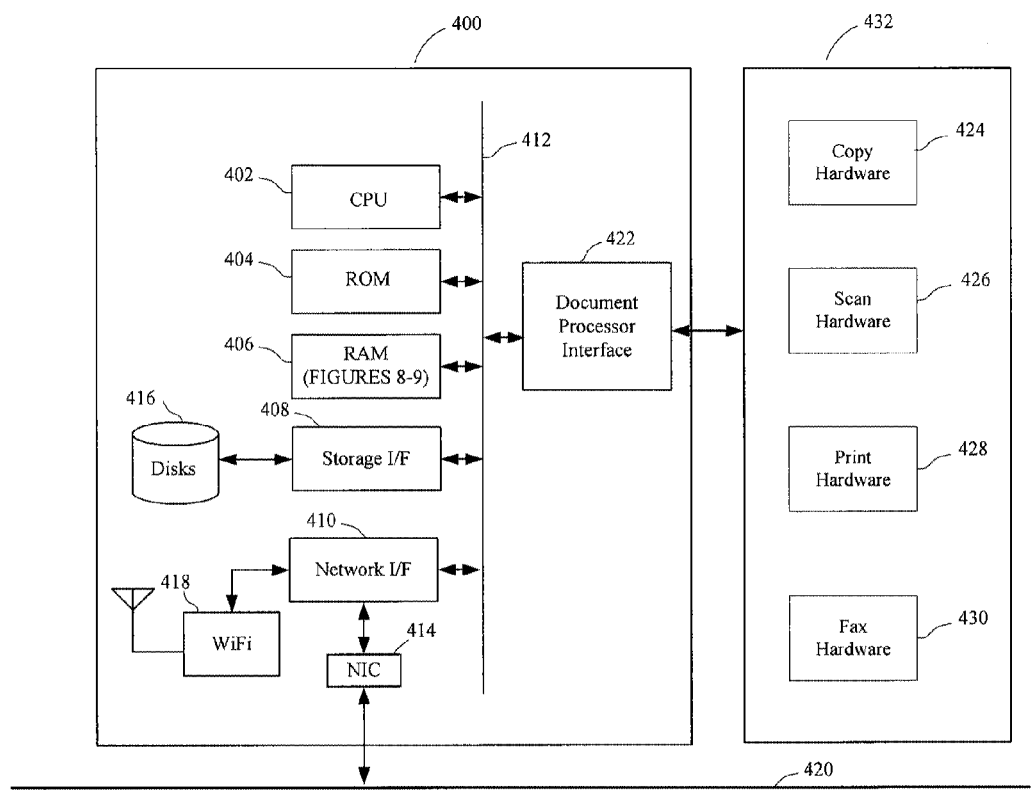
FIG. 4 is a block diagram illustrating controller hardware for use in the system for selective control of advertising messages on distributed document processing devices according to one embodiment of the subject application.

Turning now to FIG. 4, illustrated is a representative architecture of a suitable backend component, i.e., the controller 400, shown in FIG. 1 as the controllers 108, 118, and 128, on which operations of the subject system 100 are completed. The skilled artisan will understand that the controller 400 is representative of any general computing device, known in the art, capable of facilitating the methodologies described herein. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration data, and other routines or data used for operation of the controller 400.

Also included in the controller 400 is random access memory 406, suitably formed of dynamic random access memory, static random access memory, or any other suitable, addressable and writable memory system. Random access memory provides a storage area for data instructions associated with applications and data handling accomplished by processor 402.

A storage interface 408 suitably provides a mechanism for non-volatile, bulk or long term storage of data associated with the controller 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the device 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network interface subsystem 410 is suitably accomplished via a bus data transfer mechanism, such as illustrated by bus 412.

Also in data communication with the bus 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
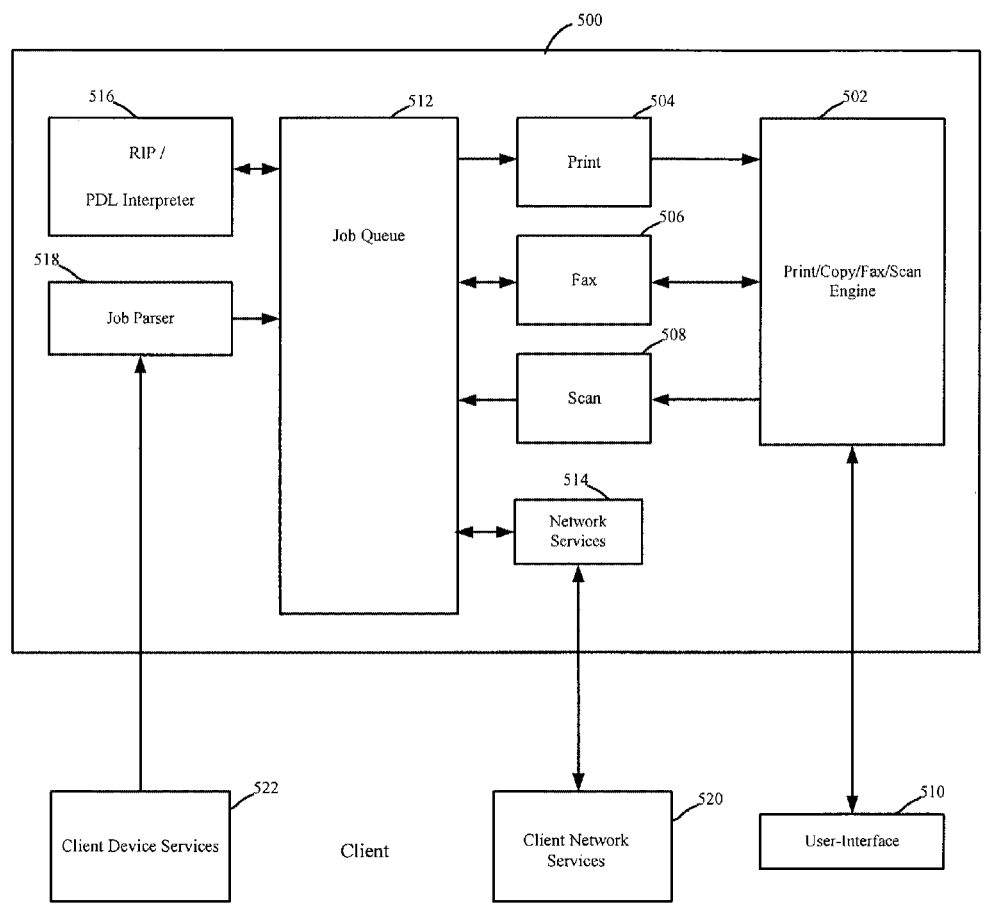
FIG. 5 is a functional diagram illustrating the controller for use in the system for selective control of advertising messages on distributed document processing devices according to one embodiment of the subject application.

Functionality of the subject system 100 is accomplished on a suitable document processing device, such as the document processing devices 104, 114, and 124, which includes the controller 400 of FIG. 4 (shown in FIG. 1 as the controllers 108, 118, and 128), as an intelligent subsystem associated with a document processing device. In the illustration of FIG. 5, controller function 500 in the preferred embodiment, includes a document processing engine 502. A suitable controller functionality is that incorporated into the Toshiba e-Studio system in the preferred embodiment. FIG. 5 illustrates suitable functionality of the hardware of FIG. 4 in connection with software and operating system functionality as will be appreciated by one of ordinary skill in the art.

In the preferred embodiment, the engine 502 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that perform one or more of the document processing operations listed above.

The engine 502 is suitably interfaced to a user interface panel 510, which panel allows for a user or administrator to access functionality controlled by the engine 502. Access is suitably enabled via an interface local to the controller, or remotely via a remote thin or thick client.

The engine 502 is in data communication with the print function 504, facsimile function 506, and scan function 508. These functions facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 308 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser suitably functions to receive print job language files from an external device, such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the afore-described functionality and components.

Figure 6:
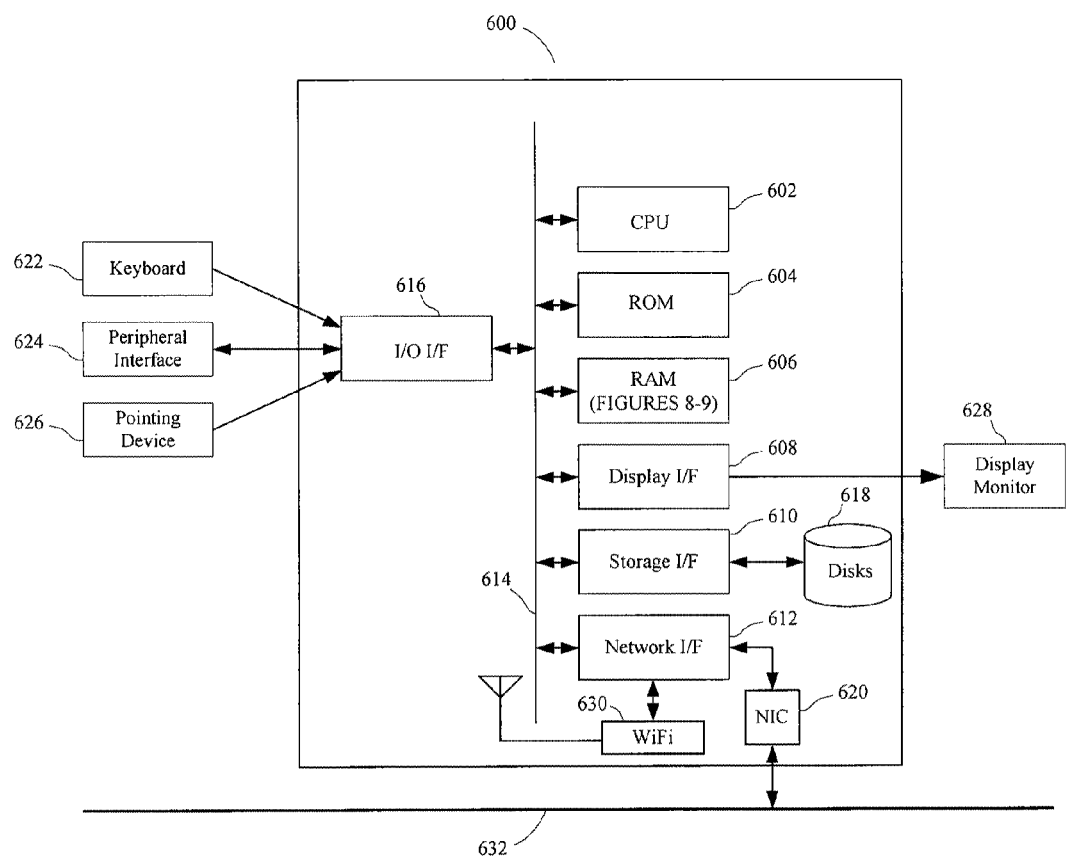
FIG. 6 is a functional diagram illustrating a user device for use in the system for selective control of advertising messages on distributed document processing devices according to one embodiment of the subject application.

Turning now to FIG. 6, illustrated is a hardware diagram of a suitable workstation 600, shown in FIG. 1 as the user device 158, for use in connection with the subject system. A suitable workstation includes a processor unit 602 which is advantageously placed in data communication with read only memory 604, suitably non-volatile read only memory, volatile read only memory or a combination thereof, random access memory 606, display interface 608, storage interface 610, and network interface 612. In a preferred embodiment, interface to the foregoing modules is suitably accomplished via a bus 614.

The read only memory 604 suitably includes firmware, such as static data or fixed instructions, such as BIOS, system functions, configuration data, and other routines used for operation of the workstation 600 via CPU 602.

The random access memory 606 provides a storage area for data and instructions associated with applications and data handling accomplished by the processor 602.

The display interface 608 receives data or instructions from other components on the bus 614, which data is specific to generating a display to facilitate a user interface. The display interface 608 suitably provides output to a display terminal 628, suitably a video display device such as a monitor, LCD, plasma, or any other suitable visual output device as will be appreciated by one of ordinary skill in the art.

The storage interface 610 suitably provides a mechanism for non-volatile, bulk or long term storage of data or instructions in the workstation 600. The storage interface 610 suitably uses a storage mechanism, such as storage 618, suitably comprised of a disk, tape, CD, DVD, or other relatively higher capacity addressable or serial storage medium.

The network interface 612 suitably communicates to at least one other network interface, shown as network interface 620, such as a network interface card, and wireless network interface 630, such as a WiFi wireless network card. It will be appreciated by one of ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by one of ordinary skill in the art. In the illustration, the network interface 620 is interconnected for data interchange via a physical network 632, suitably comprised of a local area network, wide area network, or a combination thereof.

An input/output interface 616 in data communication with the bus 614 is suitably connected with an input device 622, such as a keyboard or the like. The input/output interface 616 also suitably provides data output to a peripheral interface 624, such as a USB, universal serial bus output, SCSI, Firewire (IEEE 1394) output, or any other interface as may be appropriate for a selected application. Finally, the input/output interface 616 is suitably in data communication with a pointing device interface 626 for connection with devices, such as a mouse, light pen, touch screen, or the like.

Figure 7:
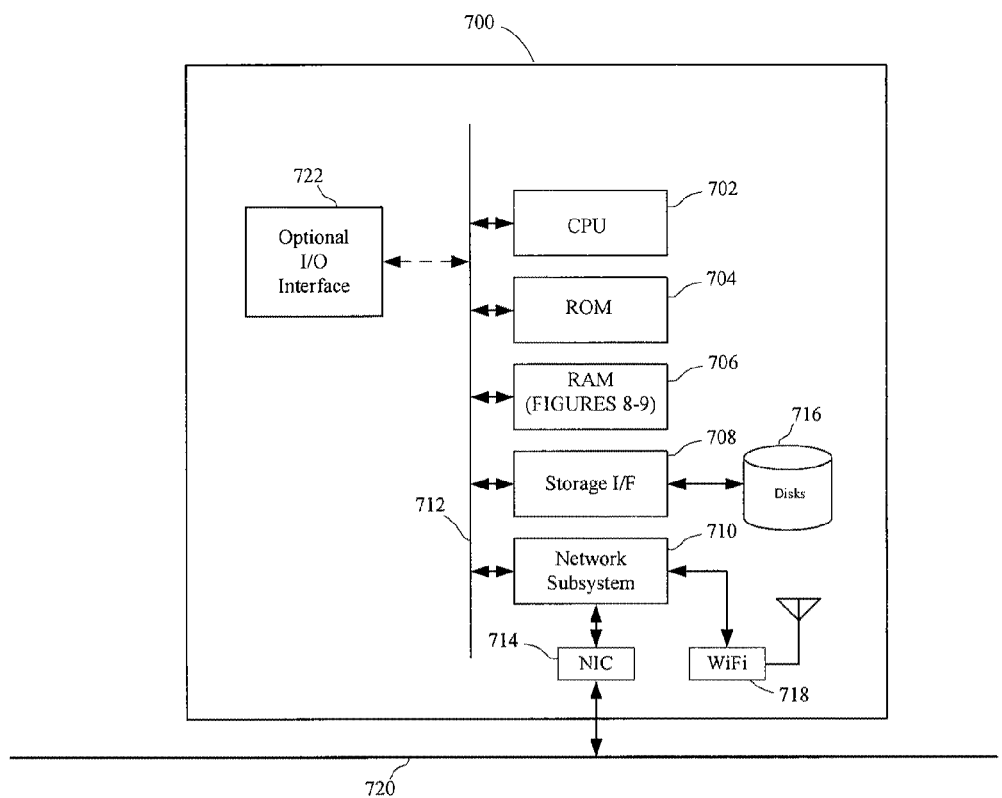
FIG. 7 is a functional diagram illustrating a server for use in the system for selective control of advertising messages on distributed document processing devices according to one embodiment of the subject application.

Turning now to FIG. 7, illustrated is a representative architecture of a suitable server 700, shown in FIG. 1 as the server 162, on which operations of the subject system are completed. Included is a processor 702, suitably comprised of a central processor unit. However, it will be appreciated that processor 702 may advantageously be composed of multiple processors working in concert with one another as will be appreciated by one of ordinary skill in the art. Also included is a non-volatile or read only memory 704 which is advantageously used for static or fixed data or instructions, such as BIOS functions, system functions, system configuration, and other routines or data used for operation of the server 700.

Also included in the server 700 is random access memory 706, suitably formed of dynamic random access memory, static random access memory, or any other suitable, addressable memory system. Random access memory provides a storage area for data instructions associated with applications and data handling accomplished by the processor 702.

A storage interface 708 suitably provides a mechanism for volatile, bulk or long term storage of data associated with the server 700. The storage interface 708 suitably uses bulk storage, such as any suitable addressable or serial storage, such as a disk, optical, tape drive and the like as shown as 716, as well as any suitable storage medium as will be appreciated by one of ordinary skill in the art.

A network interface subsystem 710 suitably routes input and output from an associated network allowing the server 700 to communicate to other devices. The network interface subsystem 710 suitably interfaces with one or more connections with external devices to the server 700. By way of example, illustrated is at least one network interface card 714 for data communication with fixed or wired networks, such as Ethernet, token ring, and the like, and a wireless interface 718, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 714 is interconnected for data interchange via a physical network 720, suitably comprised of a local area network, wide area network, or a combination thereof.

Data communication between the processor 702, read only memory 704, random access memory 706, storage interface 708 and the network subsystem 710 is suitably accomplished via a bus data transfer mechanism, such as illustrated by bus 712.

Suitable executable instructions on the server 700 facilitate communication with a plurality of external devices, such as workstations, document processing devices, other servers, or the like. While, in operation, a typical server operates autonomously, it is to be appreciated that direct control by a local user is sometimes desirable, and is suitably accomplished via an optional input/output interface 722 as will be appreciated by one of ordinary skill in the art.

In operation, device identification data corresponding to the identity of networked document processing devices available for display of selected advertising content is first received. Device selection data is then received representing a selected subset of the networked document processing devices. The selection of the subset is made based upon the received identification data. Next, customization data is received corresponding to a selected display parameter associated with the selected advertising content. The selected advertising content and the received customization data are then communicated to each of the networked document processing devices in the selected subset. Thereafter, each of the document processing devices commences the display of the selected advertising content in accordance with the customization data.

In accordance with one example embodiment of the subject application, the user device 158 receives identification data corresponding to the identity of each of the document processing devices 104, 114, and 124 coupled to the computer network 102. The skilled artisan will appreciate that the identification data is capable of being received by the user device 158 from the specific document processing devices 104, 114, and 124, from the server 162, or the like. It will be understood by those skilled in the art that while reference is made with respect to the user device 158 in the instant example, an associated user is able to perform the subject application from a variety of different electronic devices. According to one embodiment of the subject application, the user device 158 includes a thin client interface, a graphical user interface, or the like, suitably adapted to facilitate the selection of advertising content and customization data for the display of such content on one or more networked document processing devices 104, 114, and 124. The user device 158 then generates a suitable display of the identified document processing devices 104, 114, and 124 to an associated user for a selection thereof. To facilitate the selection of one or more document processing device 104, 114, or 124 by the user, the user device 158 displays attribute data associated with each of the devices 104, 114, and 124. In accordance with one embodiment of the subject application, the attribute data includes, for example and without limitation, display capabilities, locations, services, and the like, associated with the respective document processing devices 104, 114, and 124.

The user is then prompted to select one or more document processing devices 104, 114, and/or 124 for display of advertisement content based upon the displayed attribute data. It will be appreciated by those skilled in the art that other selection criteria are equally capable of being used by the associated user for the selection of desired document processing devices 104, 114, and 124. The user device 158 then generates device selection data following receipt of selection data corresponding to a selected subset of document processing devices 104, 114, and/or 124. Selected advertising content is then retrieved in accordance with user provided instructions. That is, the user device 158, upon instructions from the associated user, retrieves advertising content from the database 164 of the server 162, from a portable storage associated with the user device 158, from a network storage (not shown), from a website, or the like. It will be appreciated by those skilled in the art that the advertising content is capable of corresponding to any suitable graphic, text, animation, or the like, associated with the a product or service associated with the user. Preferably, the user selects the desired advertising content for display on selected document processing devices 104, 114, and 124 via a graphical user interface generated on the user device 158. In accordance with one embodiment of the subject application, the server 162, via the database 164, includes a plurality of advertisements available for selection by the user via the user device 158.

Customization data is then received by the user device 158 from the associated user corresponding to a customization of the selected advertising content. According to one embodiment of the subject application, the customization data includes, for example and without limitation, a time of initiation of the display of the selected advertising content, a duration of the display of the selected advertising content, a placement of the selected advertising content on each document processing device display (106, 116, 126), a placement of the selected advertising content on each display 136, 144, and 152 of the kiosks 134, 142, and 150 associated with each document processing device 104, 114, and 124, a size of the display of the selected advertising content on each display, e.g. 106, 116, 126, 136, 144, and 152, and the like.

Charge data is then generated corresponding to the cost associated with the display of the selected advertising content on the selected document processing devices 104, 114, and 124. In accordance with one embodiment of the subject application, the user device 158 is in data communication with the backend server 162, which facilitates the display of the selected advertising content on the selected subset of document processing devices 104, 114, and 124. Preferably, the charge data is generated by the server 162 in association with the selected advertising content, the customization data, and the number of document processing devices 104, 114, and 124 in the selected subset. The skilled artisan will appreciate that the charges thus calculated are capable of being based upon predetermined rates, costs associated with the operations of the document processing devices 104, 114, and 124, and the like. In accordance with one embodiment of the subject application, the user is billed or charged for the display of the selected advertising content. According to a further embodiment of the subject application, payment, e.g. credit card, prepaid account, etc., is received from the user via the user device 158 and credited by the server 162 against the charge data.

Following the generation of charge data, the selected advertising content and associated customization data are then communicated to each of the document processing devices 104, 114, and 124 in the selected subset via the computer network 102. Each of the document processing devices 104, 114, and 124 in the selected subset receives the selected advertising content and associated customization data and tests the content for compatibility. In accordance with one embodiment of the subject application, the server 162 is tasked with determining the compatibility of the selected advertising content so as to determine whether the selected devices 104, 114, and/or 124 are capable of displaying the content. For example, the selected content may require color displays, which are only available on the first document processing device 104 and the second document processing device 114. In such an example, the server 162, or alternatively the individual document processing devices 104, 114, and 124 each determine whether the selected content is capable of being displayed. When it is determined that the third document processing device 124 is incapable of displaying the selected content, an incompatibility notification is generated to the associated user. According to one embodiment of the subject application, the compatibility of the received advertising content is made in accordance with the acceptability of the content, e.g. profanity, violence, obscenity, or the like, are capable of corresponding to incompatible content. Preferably, the user is notified of the incompatibility of the selected content with respect to any document processing device 104, 114, or 124 incapable of displaying the advertising content via the user device 158, electronic mail notification, SMS messaging, or the like.

Once the advertising content is determined to be compatible with the selected document processing devices 104, 114, and 124, the controller 108, 118, and 128, or other suitable component associated with the document processing device 104, 114, and 124, designates the received advertising content as selected content for display on the user interface 106, 116, and 126 (or displays 136, 144, and 152). In accordance with one embodiment of the subject application, the selected content and corresponding customization data is then stored locally in the data storage device 110, 120, and 130 associated with each of the document processing devices 104, 114, and 124.

The selected content remains in storage 110, 120, and 130 until such time as the controllers 108, 118, and 128 determine that the corresponding document processing device 104, 114, and 124 is in an idle mode. That is, the controllers 108, 118, and 128 wait until there are no pending document processing operations on their respective document processing devices 104, 114, and 124. Once a document processing device 104, 114, and 124 is in an idle period, the generation of the selected adverting content is commenced on the associated display 106, 116, and 126 (or displays 136, 144, and 152). It will be appreciated by those skilled in the art that the idle period is capable of being predefined by a suitable administrator, manufacturer, vendor, service provider, or the like, reflecting a predetermined period of inactivity of the associated document processing device 104, 114, and 124.

Figure 8:
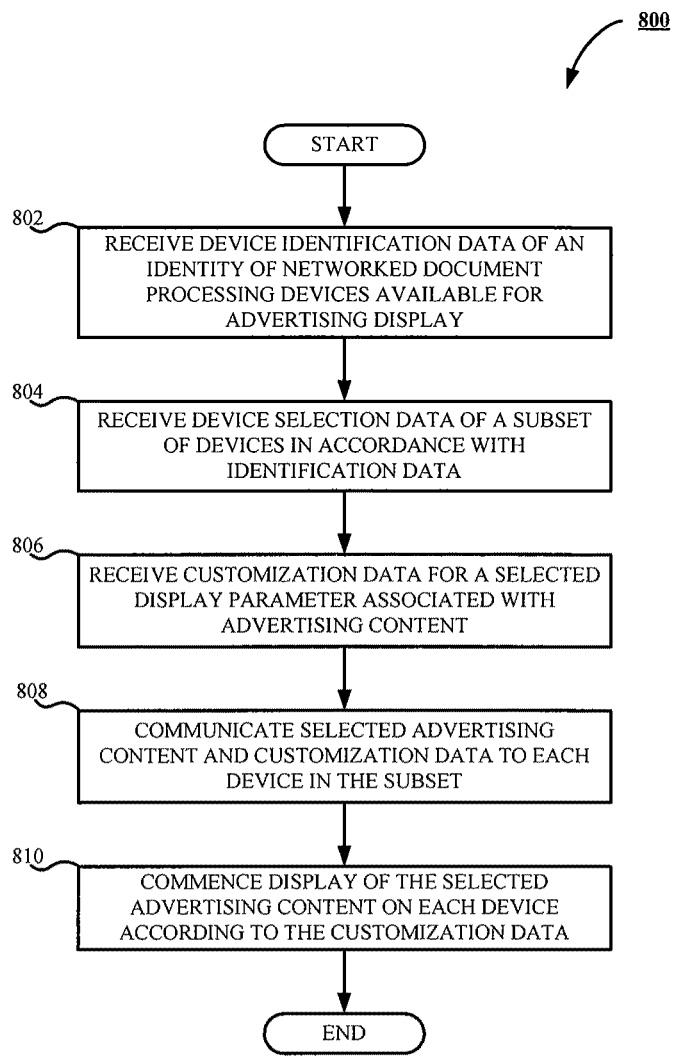
FIG. 8 is a flowchart illustrating a method for selective control of advertising messages on distributed document processing devices according to one embodiment of the subject application.

The skilled artisan will appreciate that the subject system 100 and components described above with respect to FIG. 1, FIG. 2, FIG. 3, FIG. 4, FIG. 5, FIG. 6, and FIG. 7 will be better understood in conjunction with the methodologies described hereinafter with respect to FIG. 8 and FIG. 9. Turning now to FIG. 8, there is shown a flowchart 800 illustrating a method for selective control of advertising messages on distributed document processing devices in accordance with one embodiment of the subject application. Beginning at step 802, a user device 158 receives device identification data corresponding to the identity of each document processing device 104, 114, and 124 coupled to the computer network 102 and available for the display of selected advertising content. Preferably, the user device 158 includes a thin client interface, such as a web browser, a graphical user interface, or the like, suitably adapted to interact with an associated user. In accordance with one embodiment of the subject application, the user device 158 is in data communication with the server 162, which facilitates the display of selected advertising content on selected document processing devices 104, 114, and 124. At step 804, the user device 158 receives device selection data from the associated user representing a selected subset of networked document processing devices 104, 114, and 124. According to one embodiment of the subject application, the selection data is made in accordance with the received device identification data.

Customization data is then received from the associated user via the user device 158 corresponding to a selected display parameter associated with the selected advertising content at step 806. In accordance with one embodiment of the subject application, the customization data includes, for example and without limitation, a time of initiation of a display of the selected advertising content, a duration of a display of the selected advertising content, a placement of the selected advertising content on each document processing device display, a size of a display of the advertising content on each document processing device display, and the like. At step 808, the selected advertising content and the associated customization data are then communicated to each of the document processing devices 104, 114, and 124 in the selected subset of devices via the computer network 102. It will be appreciated by those skilled in the art that the user device 158 or the server 162 are equally capable of communicating such content and customization data to the selected document processing devices 104, 114, and 124 in accordance with the method depicted in FIG. 8. Each of the document processing devices 104, 114, and 124 then commences the display of the selected advertising content in accordance with the customization data at step 810.

Figure 9:
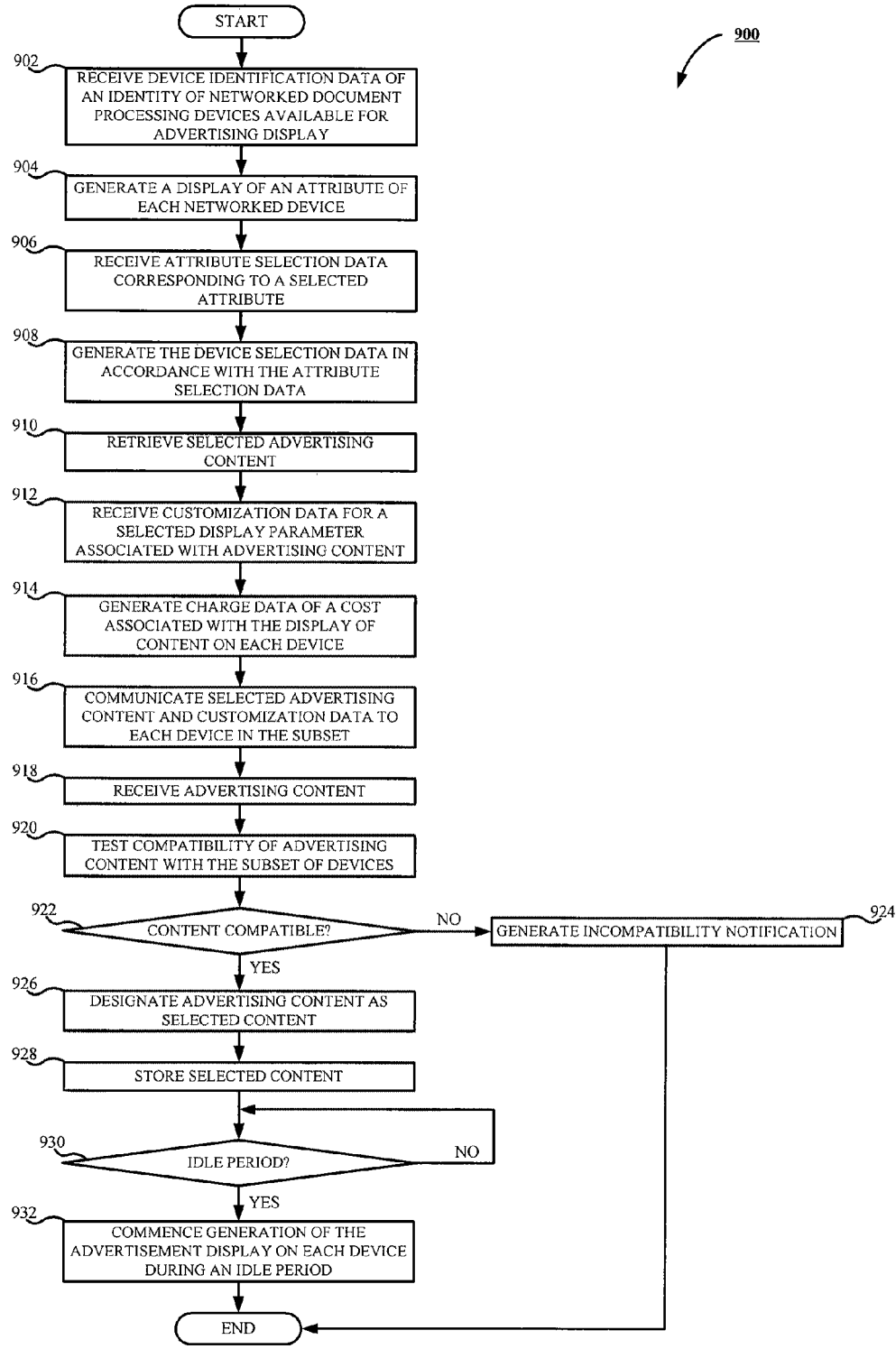
FIG. 9 is a flowchart illustrating a method for selective control of advertising messages on distributed document processing devices according to one embodiment of the subject application.

Referring now to FIG. 9, there is shown a flowchart 900 illustrating a method for selective control of advertising messages on distributed document processing devices in accordance with one embodiment of the subject application. The methodology of FIG. 9 begins at step 902, whereupon the user device 158 receives identification data corresponding to each of the networked document processing devices 104, 114, and 124 coupled to the computer network 102 for the display of selected advertising content. Preferably, the identification data represents the identity of each document processing device 104, 114, and 124 available via the computer network 102. It will be understood by those skilled in the art that the identification data is capable of being received by the user device 158 from the specific document processing devices 104, 114, and 124, from the server 162, or the like. Preferably, the user device 158 includes a suitable thin client interface, graphical user interface, software application, or the like, suitably configured to interact with the associated user during selection of advertising content for display on selected devices as set forth in FIG. 9. The skilled artisan will appreciate that while reference is made to the user device 158 with respect to FIG. 9, an associated user is able to perform the subject application from a variety of different electronic devices.

At step 904, the user device 158 generates a suitable display of an attribute of each identified document processing device 104, 114, and 124. In accordance with one embodiment of the subject application, the attribute data includes, for example and without limitation, display capabilities, locations, services, and the like, associated with the respective document processing devices 104, 114, and 124. At step 906, attribute selection data is received from the associated user corresponding to a selected attribute. It will be appreciated by those skilled in the art that the selection of a desired attribute enables the generation of device selection data at step 908. That is, the desired attribute is used by the user device 158 at step 908 so as to determine which of those document processing devices 104, 114, and 124 coupled to the computer network 102 and available for displaying advertising content are suitable for the associated user.

Selected advertising content is then retrieved by the user device 158 at step 910. In accordance with one embodiment of the subject application, the user device 158 retrieves advertising content from the database 164 of the server 162, from a portable storage associated with the user device 158, from a network storage (not shown), from a website, or the like. Those skilled in the art will appreciate that the advertising content is capable of corresponding to any suitable graphic, text, animation, or the like, associated with a product or service associated with the user. According to one embodiment of the subject application, the server 162, via the database 164, includes a plurality of advertisements available for selection by the user via the user device 158.

At step 912, customization data is received by the user device 158 from the associated user a selected display parameter associated with the selected advertising content. As set forth above, suitable examples of such customization data include, without limitation, a time of initiation of the display of the selected advertising content, duration of the display of the selected advertising content, placement of the selected advertising content on each document processing device display (106, 116, 126), placement of the selected advertising content on each display 136, 144, and 152 of the kiosks 134, 142, and 150 associated with each document processing device 104, 114, and 124, size of the display of the selected advertising content on each display, e.g. 106, 116, 126, 136, 144, and 152, and the like.

Charge data is then generated at step 914 corresponding to the cost associated with the display of the selected advertising content on the selected document processing devices 104, 114, and 124. In accordance with one embodiment of the subject application, the charge data is generated by the server 162 in association with the selected advertising content, the customization data, and the number of document processing devices 104, 114, and 124 in the selected subset. According to a further embodiment of the subject application, the calculated charges are capable of being based upon predetermined rates, costs associated with the operations of the document processing devices 104, 114, and 124, and the like. In accordance with another embodiment of the subject application, the user is billed or charged for the display of the selected advertising content. According to one embodiment of the subject application, payment, e.g. credit card, prepaid account, etc., is received from the user via the user device 158 and credited by the server 162 against the charge data.

At step 916, the selected advertising content and associated customization data are communicated to each of the document processing devices 104, 114, and 124 in the selected subset via the computer network 102.

The document processing devices 104, 114, and 124 in the selected subset each receives the selected advertising content and associated customization data at step 918. Flow then proceeds to step 920, whereupon the advertising content is tested for compatibility. A determination is then made at step 922 in accordance with the output of the testing whether the advertising content is compatible for display on the selected document processing devices 104, 114, and 124. In accordance with one embodiment of the subject application, the server 162 determines the compatibility of the selected advertising content with respect to the display capabilities of the selected devices 104, 114, and/or 124. According to another example embodiment of the subject application, the controllers 108, 118, and 128 associated with the selected document processing 104, 114, and 124 each individually determine whether the selected content is capable of being displayed. In accordance with one example embodiment of the subject application, the compatibility of the received advertising content is determined based upon the content itself, e.g. profane, violent, obscene, or other prurient content is incompatible for display on the document processing devices 104, 114, and 124.

Upon a determination at step 922 that the content is not compatible with a document processing device 104, 114, or 124, flow proceeds to step 924, whereupon the user associated with the selected advertising content is notified of the incompatibility. Thereafter, operations terminate with respect to FIG. 9. When it is determined at step 922 that the advertising content is compatible with the display capabilities of the selected document processing devices 104, 114, and/or 124, flow proceeds to step 926. At step 926, the received advertising content and associated customization data are designated as the selected content for display by the associated document processing device 104, 114, and/or 124. At step 928, the selected content and corresponding customization data is then stored locally in the data storage device 110, 120, and 130 associated with each of the document processing devices 104, 114, and 124.

A determination is then made at step 930 whether the document processing device 104, 114, and/or 124 is in an idle period. Upon a determination at step 930 that a document processing device 104, 114, and 124 is in an idle period, operations proceed to step 932, whereupon generation of the selected adverting content is commenced on the associated display 106, 116, and 126 (or displays 136, 144, and 152). When it is determined at step 930 that the document processing device 104, 114, and 124 is not in an idle period, the controllers 108, 118, and 128 or other suitable component maintains the received content and data in storage 110, 120, and 130. That is, the controllers 108, 118, and 128 wait until there are no pending document processing operations on their respective document processing devices 104, 114, and 124. It will be appreciated by those skilled in the art that the idle period is capable of being predefined by a suitable administrator, manufacturer, vendor, service provider, or the like, reflecting a predetermined period of inactivity of the associated document processing device 104, 114, and 124.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A system for selective control of advertising messages on distributed document processing devices comprising:
    means for receiving device identification data corresponding to each of a plurality of networked document processing devices available for display of selected advertising content;
    means for receiving device selection data representative of a selected subset of the plurality of networked document processing devices identified by the identification data;
    means for receiving customization data corresponding to a selected display parameter associated with the selected advertising content;
    means for communicating the selected advertising content and the customization data to each of the selected subset so as to commence display of the selected advertising content on each of the selected subset as directed by the customization data, the display commenced during an idle period for each of the selected subset;
    testing means for testing compatibility of the selected advertising content with each of the selected subset; and
    notification means for generating a notification when the advertising content is determined to be incompatible with one of the selected subset due to the subject matter of the advertising content.

2. The system of claim 1 wherein the customization data includes data representative of at least one of a time of initiation of a display of the selected advertising content, a duration of a display of the selected advertising content, a placement of the selected advertising content on each document processing device display, and a size of a display of the advertising content on each document processing device display.

3. The system of claim 1 further comprising means for generating charge data corresponding to a cost associated with displaying the selected advertising content on each of the selected subset as directed by the customization data.

4. The system of claim 1 further comprising:
    means for generating a display of at least one attribute of each of the plurality of networked document processing devices;
    means for receiving attribute selection data corresponding to at least one selected attribute; and
    means for generating the device selection data in accordance with the attribute selection data.

5. The system of claim 1 wherein the customization data includes data representative of at least one of a time of initiation of a display of the selected advertising content, a duration of a display of the selected advertising content, a placement of the selected advertising content on each document processing device display, and a size of a display of the advertising content on each document processing device display.

6. The system of claim 1 further comprising means for generating charge data corresponding to a cost associated with displaying the selected advertising content on each of the selected subset as directed by the customization data.

7. The system of claim 1 wherein the testing means is a server.

8. The system of claim 1 wherein the testing means is incorporated into each of the selected subset.

9. A method for selective control of advertising messages on distributed document processing devices comprising:
- receiving device identification data corresponding to each of a plurality of networked document processing devices available for display of selected advertising content;
- receiving device selection data representative of a selected subset of the plurality of networked document processing devices identified by the identification data;
- receiving customization data corresponding to a selected display parameter associated with the selected advertising content;
- communicating the selected advertising content and the customization data to each of the selected subset so as to commence display of the selected advertising content on each of the selected subset as directed by the customization data, the display commenced during an idle period for each of the selected subset;
- testing compatibility of the selected advertising content with each of the selected subset; and
- generating a notification when the advertising content is determined to be incompatible with one of the selected subset due to the subject matter of the advertising content.

10. The method of claim 9 wherein the customization data includes data representative of at least one of a time of initiation of a display of the selected advertising content, a duration of a display of the selected advertising content, a placement of the selected advertising content on each document processing device display, and a size of a display of the advertising content on each document processing device display.

11. The method of claim 9 further comprising generating charge data corresponding to a cost associated with displaying the selected advertising content on each of the selected subset as directed by the customization data.

12. The method of claim 9 further comprising:
- generating a display of at least one attribute of each of the plurality of networked document processing devices;
- receiving attribute selection data corresponding to at least one selected attribute; and
- generating the device selection data in accordance with the attribute selection data.

13. A system for selective control of advertising messages on distributed document processing devices comprising:
- a user device for receiving device identification data corresponding to each of a plurality of networked document processing devices available for display of selected advertising content, for receiving device selection data representative of a selected subset of the plurality of networked document processing devices identified by the identification data, and for receiving customization data corresponding to a selected display parameter associated with the selected advertising content;
- a network for communicating the selected advertising content and the customization data to each of the selected subset so as to commence display of the selected advertising content on each of the selected subset as directed by the customization data, the display commenced during an idle period for each of the selected subset; and
- a server for testing compatibility of the selected advertising content with each of the selected subset and for generating a notification when the advertising content is determined to be incompatible with one of the selected subset due to the subject matter of the advertising content.

* * * * *